United States Patent Office 2,883,049
Patented Apr. 21, 1959

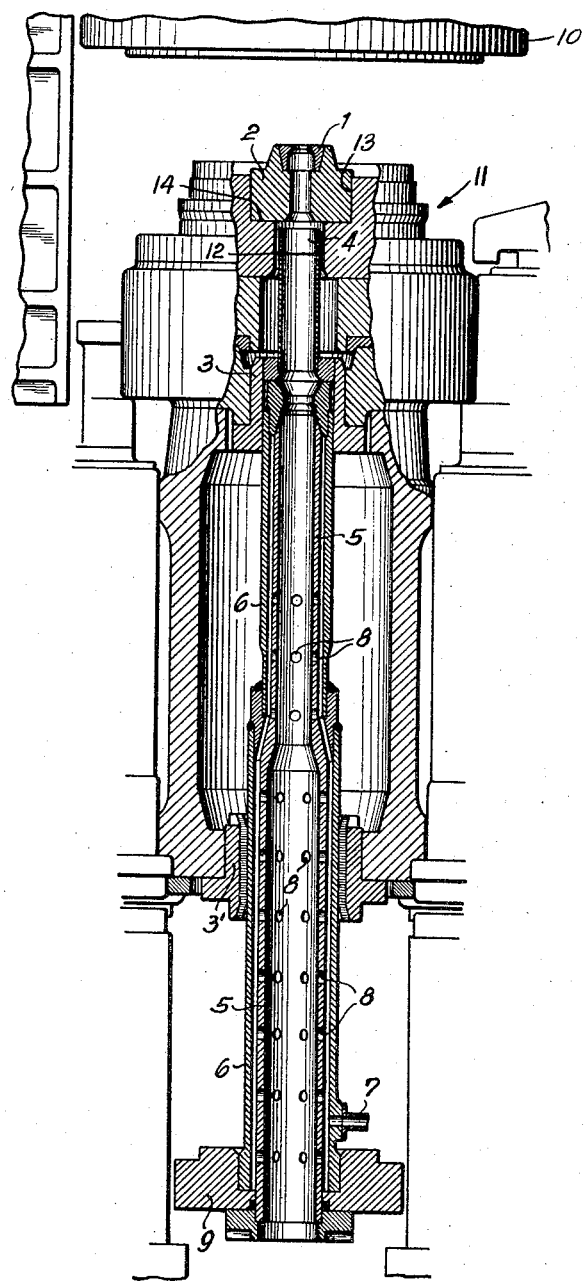

2,883,049

COMBINED DIE PUSHER AND QUENCHING DEVICE FOR EXTRUSION PRESS

Matthias Arenz, Lintorf, near Dusseldorf, Germany, assignor to Firma Schloemann Aktiengesellschaft, Dusseldorf, Germany Application April 11, 1955, Serial No. 500,503
In Germany November 28, 1949

Public Law 619, August 23, 1954
Patent expires November 28, 1969

2 Claims. (Cl. 207—1)

The present invention relates to extrusion presses.

More particularly, the present invention relates to an extrusion press for extruding an elongated member, such as a bar or tube, from a billet.

With such presses, it is customary to prepare the extruded material for tempering by quenching the extruded material immediately after it issues from the press. Also, such quenching is used when copper is extruded to prevent the oxidation thereof so as to avoid cleaning of the copper after its extrusion in preparation for further processing of the copper.

One of the objects of the present invention is to eliminate the necessity for a quenching apparatus located next to the press for quenching the extruded material issuing therefrom.

Another object of the present invention is to adapt a pusher, for moving the extrusion die, to serve also the purpose of quenching the extruded material.

A further object of the present invention is to provide a means, for quenching the extruded material, which does not require any additional space beyond that occupied by the conventional press parts.

With the above objects in view, the present invention consists of an extrusion press which includes a support means and a hollow tubular pusher coaxial with the extrusion die of the press and carried by the support means for axial movement toward and away from the die, material extruded through the die passing outwardly through the pusher. A quenching means is formed in part by this pusher for quenching extruded material as it moves through the pusher.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows only enough structure to afford a complete understanding of the invention. In the interest of conciseness many purely conventional parts well known to those skilled in the art are omitted from the drawing. The parts shown in section in the drawing are illustrated along a sectional plane which passes vertically and centrally through the press.

As is apparent from the drawing, the structure illustrated therein forms part of a vertical extrusion press, the hydraulic ram, together with a piercing ram if tubes are extruded, not being shown in the drawing, and the container or cylinder 10 for the billet, only the lower part of the cylinder being shown in the drawing. The drawing shows the extrusion die 1 which is carried by the axially bored holder 2. The parts 1 and 2 are carried by a conventional means 11 diagrammatically illustrated in the drawing. The cylinder 10 and means 11 being displaceable relative to each other and means 11 forms a bottom for the cylinder. The bottom is formed with a bore 12 and support means facing the cylinder, preferably in the form of a counterbore 13 forming a ledge 14 facing the cylinder 10 and supporting the die holder 2. An elongated tubular pusher is provided for pushing the holder 2 together with the die 1 upwardly away from its support in order to separate parts 1 and 2 from the press for cleaning purposes and the like. This pusher has an elongated tubular free end portion 4 located next to the holder 2. A pair of tubular members 3 and 3' are fixed to the support and slidably guide the pusher for axial movement, the extruded article, such as a rod or tube, moving downwardly through the tubular pusher to the exterior of the press. A member 9 is fixed to the bottom end of the pusher and is connected to an unillustrated hydraulic piston which raises the member 9 so as to also raise the pusher for moving the holder 2 upwardly from the support.

As is apparent from the drawing, the tubular pusher of the invention includes an inner tube 5 and an outer tube 6. The outer tube 6 is composed of a pair of sections which are fixed to each other and to the tube 5 in the manner illustrated. The tube 5 is spaced from tube 6 in order to define an elongated annular chamber therewith, and the inner tube 5 is formed with a plurality of perforations 8. A conduit 7 is carried by the tube 6 and communicates with the annular chamber between tubes 5 and 6. A further unillustrated conduit communicates with conduit 7 to supply a quenching liquid thereto under pressure, and this quenching liquid enters the elongated annular chamber between inner tube 5 and outer tube 6 and passes through the perforations 8 to quench the extruded material in the simplest possible manner as this material moves downwardly through the tube 5. The quenching liquid in the interior of the tube 5 may be gathered in any suitable pan which is not illustrated in the drawing.

It will be understood that each of the elements described above, or two or more together, may also find a useful application in other types of extrusion presses differing from the types described above.

While the invention has been illustrated and described as embodied in a combined pusher and quenching device for an extrusion press, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an extrusion press, in combination, a cylinder; a bottom for closing one end of said cylinder, said bottom and said cylinder being displaceable relative to each other, said bottom including a bore, a counterbore forming a ledge facing said cylinder, and an extrusion die holder mounted in said counterbore abutting against said ledge for removal in axial direction away therefrom; an inner tube co-axial with said bore and having an end located in said bore adjacent said extrusion die holder, said inner tube being formed with perforations; an outer tube surrounding and spaced from said inner tube to define an elongated annular chamber therewith, said outer tube being fixed to said inner tube; means supporting said tubes for axial movement; means for moving said tubes in axial direction so that the end of said inner tube adjacent said extrusion die holder may be used to engage and push said extrusion die holder from said counterbore when said bottom and said cylinder are displaced relative to each other; and a conduit communicating with said chamber for supplying quenching liquid thereto, whereby extruded material moving along the interior of said inner tube may be quenched by liquid passing through said perforations into the interior of said inner tube.

2. In an extrusion press, in combination, a cylinder; a bottom for closing one end of said cylinder, said bottom and said cylinder being displaceable relative to each other, said bottom including a bore, support means located adjacent said bore and facing said cylinder, and an extrusion die holder supported by said support means removable in axial direction away from said support means and toward said cylinder; an inner tube co-axial with said bore and having an end located in said bore adjacent said extrusion die holder, said inner tube being formed with perforations; an outer tube surrounding and spaced from said inner tube to define an elongated annular chamber therewith, said outer tube being fixed to said inner tube; means supporting said tubes for axial movement; means for moving said tubes in axial direction so that the end of said inner tube adjacent said extrusion die holder may be used to engage and push said extrusion die holder from said support means when said bottom and said cylinder are displaced relative to each other; and a conduit communicating with said chamber for supplying quenching liquid thereto, whereby extruded material moving along the interior of said inner tube may be quenched by liquid passing through said perforations into the interior of said inner tube.

References Cited in the file of this patent

UNITED STATES PATENTS

| | | |
|---|---|---|
| 408,377 | Cobb | Aug. 6, 1889 |
| 1,741,815 | Boynton | Dec. 31, 1929 |
| 1,983,761 | Jacobson | Dec. 11, 1934 |
| 2,002,690 | Carter | May 28, 1935 |
| 2,385,574 | Hyprath | Sept. 25, 1945 |

FOREIGN PATENTS

| | | |
|---|---|---|
| 149,912 | Sweden | May 10, 1955 |
| 657,959 | Great Britain | Oct. 3, 1951 |
| 934,404 | Germany | Oct. 20, 1955 |